(12) United States Patent
Ramzi

(10) Patent No.: US 9,202,283 B2
(45) Date of Patent: Dec. 1, 2015

(54) METHOD AND DEVICE FOR DETECTING FALLS BY IMAGE ANALYSIS

(71) Applicant: CASH SYSTEMS SECURITY, Saint Raphael (FR)

(72) Inventor: Larbi Ramzi, Nice (FR)

(73) Assignee: CASH SYSTEMS SECURITY (FR)

( * ) Notice: Subject to any disclaimer, the term of this patent is extended or adjusted under 35 U.S.C. 154(b) by 0 days.

(21) Appl. No.: 14/157,734

(22) Filed: Jan. 17, 2014

(65) Prior Publication Data
US 2015/0023551 A1    Jan. 22, 2015

(30) Foreign Application Priority Data
Jan. 17, 2013   (FR) ...................................... 13 50416

(51) Int. Cl.
*G06K 9/00*      (2006.01)
*G06T 7/20*      (2006.01)
*G06K 9/46*      (2006.01)

(52) U.S. Cl.
CPC .............. *G06T 7/20* (2013.01); *G06K 9/00342* (2013.01); *G06K 9/4604* (2013.01); *G06T 7/2033* (2013.01); *G06T 2207/10016* (2013.01); *G06T 2207/30196* (2013.01)

(58) Field of Classification Search
USPC ......................................................... 382/103
See application file for complete search history.

(56) References Cited

U.S. PATENT DOCUMENTS

| | | | |
|---|---|---|---|
| 2002/0044682 A1 | 4/2002 | Weil et al. | |
| 2008/0004904 A1* | 1/2008 | Tran ................................. | 705/2 |
| 2010/0049095 A1* | 2/2010 | Bunn et al. .................... | 600/595 |

* cited by examiner

*Primary Examiner* — Yon Couso
(74) *Attorney, Agent, or Firm* — Cantor Colburn LLP

(57) ABSTRACT

A method for detecting a fall of a person by analysis of a stream of video images originating from an image capture device, including: acquisition of successive images of a determined scene; selection of at least one point of the scene in the images; determination of the movement of each point selected by analysis of the displacement of the point in the successive images in the form of a temporal succession of vectors oriented proportionally to the instantaneous velocity of the movement of the point; computation of the instantaneous acceleration of each point associated with each vector representing the instantaneous velocity; detection of a fall when the determined instantaneous velocity is above a predefined threshold velocity and the instantaneous acceleration is above a predefined threshold acceleration.

10 Claims, 3 Drawing Sheets

METHOD AND DEVICE FOR DETECTING FALLS BY IMAGE ANALYSIS

TECHNICAL FIELD

The present invention relates to a method, a computer program product and a device for detecting falls by image analysis.

STATE OF THE ART

With the increase in the population of people facing loss of autonomy, or living alone, it is becoming more and more important to detect potential falls of the latter when they are isolated in their bedrooms or apartments.

To solve this problem, currently known devices take the form of necklaces or bracelets having a button enabling the wearer to alert a call centre in the event of a problem, such as a fall. The drawback of this type of device is that it becomes useless in the event of loss of consciousness of the wearer.

Similar so-called "dead man" devices automatically detect a fall and/or an immobile prone position. But since these devices are restrictive to put on, they are very often "forgotten" and for this reason cannot fulfil their purpose.

Among other devices, there are carpets including detectors and which are installed around the bed of a person. These carpets have a relatively high cost and since their installation is often complicated, they are used only in care homes having a large proportion of residents to monitor.

Finally, the use of monitoring cameras has been considered for many years.

However, all systems based on centralization of the images in a monitoring centre in which staff examine the images come up against the fact that this constitutes an unacceptable intrusion into a person's private life.

Thus many studies have concerned the detection of falls by automatic image analysis. However, to date no result has made it possible to install a functional system, either because the necessary computing means are too extensive, or due to lack of reliability because the detection generates too many false positives, or false negatives.

There is therefore a real need for a method and device for detecting falls by image analysis that will alleviate these defects, drawbacks and obstacles of the prior art, in particular for a method making it possible to control the necessary computing power, and therefore to reduce costs while having a high degree of reliability.

DESCRIPTION OF THE INVENTION

To resolve one or more of the drawbacks of the prior art, according to an aspect of the invention, a method for detecting a fall of a person by analysis of a stream of video images, comprises:
  acquisition of successive images of a determined scene;
  selection of at least one point of the scene in said images;
  determination of the movement of each selected point by analysis of the displacement of said point in the successive images in the form of a temporal succession of vectors oriented proportionally to the instantaneous velocity of the movement of said point;
  computation of the instantaneous acceleration of each point associated with each vector representing the instantaneous velocity;
  detection of a fall when the determined instantaneous velocity is above a predefined threshold velocity and the instantaneous acceleration is above a predefined threshold acceleration.

In particular embodiments that can be used alone or in combination:
  the fall is detected when, moreover, the orientation of the instantaneous velocity vector is included in a predefined directional sector;
  several regions of interest are defined inside the scene so that the fall detection is performed only for movements inside these regions of interest;
  a fall is detected only if the fall detection is performed for a number of points above a predetermined value;
  an alarm is triggered when, moreover, no movement is detected during a determined period;
  as the person is wearing a fall detection bracelet, an alarm is triggered when a fall detected by analysis of the video stream is confirmed by the bracelet;
  apart from the alarm, a message accompanied by a photo of the scene is sent;
  with the fall detection taking place in real time, the velocity vector and the acceleration of each point are computed for each new image taking as parameter the variation of the position of the point in the new image and the preceding images.

In a second aspect of the invention, a computer program product comprises program instructions suitable for implementing the above method when the program product is executed on a computer.

In a third aspect of the invention, a system for detecting the fall of a person by analysis of a stream of video images, comprises:
  a device for acquiring successive images of a determined scene;
  a means for selecting at least one point of the scene in said images;
  a computer of the movement of each point selected by analysis of the displacement of said point in the successive images in the form of a temporal succession of vectors oriented proportionally to the instantaneous velocity of the movement of said point;
  a computer of the instantaneous acceleration of each point associated with each vector representing the instantaneous velocity;
  a means for detecting a fall when the determined instantaneous velocity is above a predefined threshold velocity and the instantaneous acceleration is above a predefined threshold acceleration.

Other advantages may also be apparent to those skilled in the art on reading the examples below, illustrated by the appended figures, given by way of illustration.

EMBODIMENTS

Figure 1:
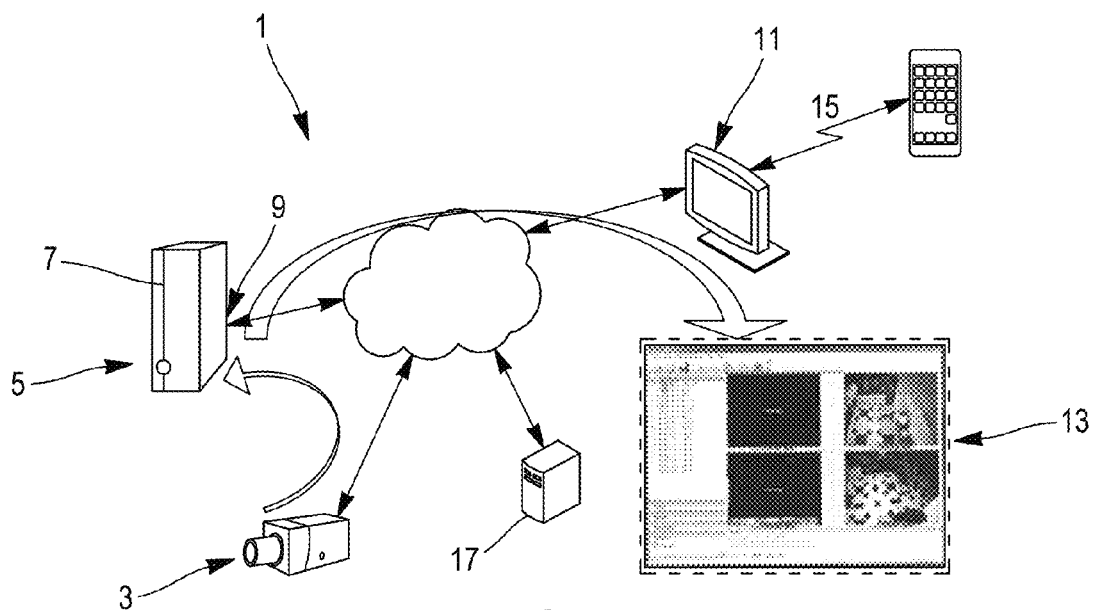
FIG. 1 shows the architecture of a fall detection system in an embodiment of the invention.
Figure 2:
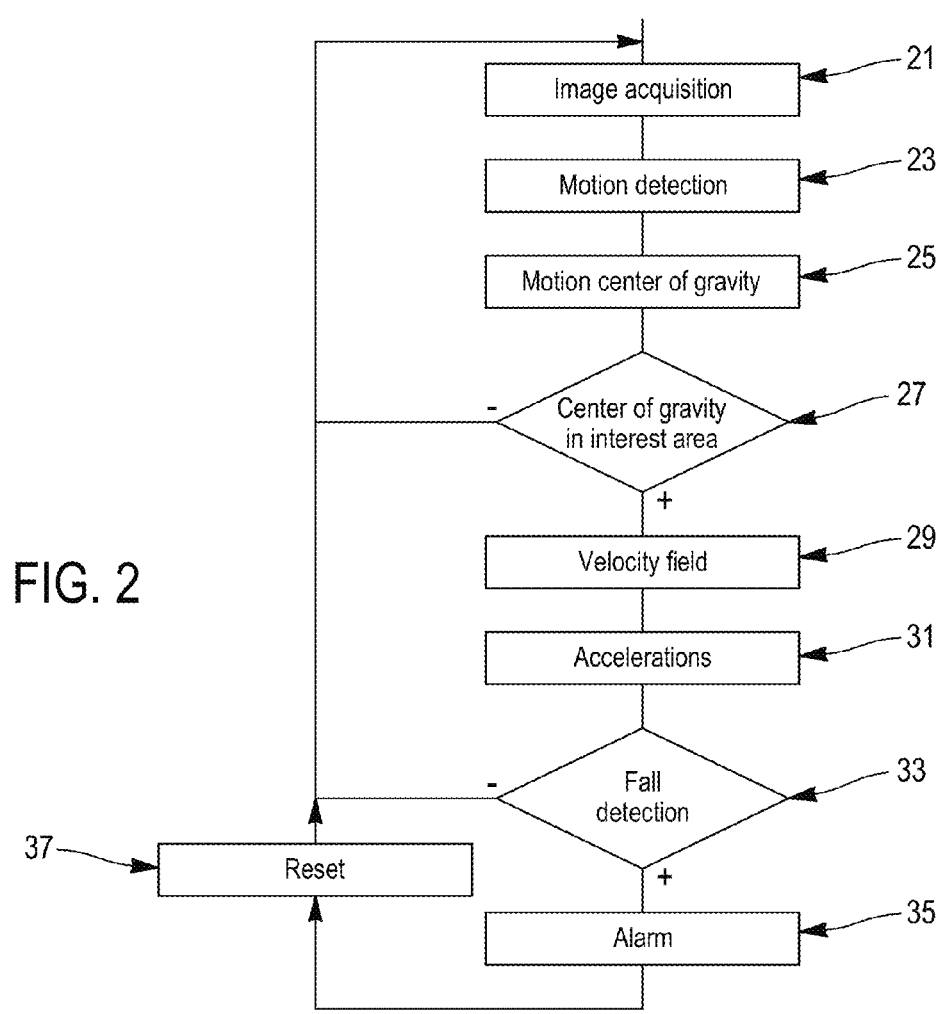
FIG. 2 shows a fall detection method in a first embodiment, as implemented by the system in FIG. 1.

With reference to FIG. 1, a fall detection system 1 comprises an image acquisition device 3 such as, for example, an IP camera. This camera 3 is connected to a computer 5. The computer 5 comprises means for analysing images 7 and means for connecting 9 to a monitoring station 11. The monitoring station 11 comprises means for displaying images 13 and means for sending messages 15 as well as a recording server 17.

The operating mode of the system 1 in a first embodiment is as follows.

The image acquisition device 3 acquires, step 21, a stream of video images. This video stream can appear in the form of a video file, for example in the .avi format, or originate directly from a camera such as a webcam.

Whatever the origin and format of the video stream, the latter is transformed, step 23, into a succession of greyscale images. It will be noted that these preliminary processes can be performed with well-known software such as the "FFD-Show" library and/or the "FFMpeg" decoder.

In step 23, detection of movement is performed, for example by analysis of triphased images. Thus, for example, the greyscale of each pixel is compared between two successive images. Specifically, if the greyscale varies, this can give rise to the supposition that there has been a movement of the object sensed by the pixel.

In the following text, the term "point" refers to a single element of the captured scene and "pixel" refers to its counterpart on an image: when a point is immobile, it is permanently found on the same pixel (in the sense of an element of the matrix forming the image) whereas a mobile point moves over different pixels in successive images.

The image acquisition device 3 being fixed, it captures a determined scene, a bedroom for example. In the acquired images, it is therefore possible to predefine a particular region or regions of interest in which only the fall detection will be performed. Indeed, if for example the images comprise part of the ceiling of the bedroom, it is understood that this region does not hold any interest for detecting the possible fall of the occupant of this room.

Thus, in step 25, the centre of gravity, or barycentre, of the detected movement is determined, and in step 27, this centre of gravity is located with respect to the regions of interest.

The rest of the processing is then performed only if the centre of gravity is inside the predefined region or regions of interest, which has the advantage of reducing the computations to be performed.

In step 29, the changes of images due to the movement during a time interval dt, for example the time between two successive images, are analysed to represent in a two-dimensional image the velocity field that the movement of a point in three dimensions represents. With this aim, the "Optical Flow" algorithm can be used. Thus for a point, with its corresponding pixel of an image is associated a vector representing the direction and the magnitude of the instantaneous velocity of this point at the moment corresponding to the time the image was shot. It will be noted that this computation is based on two hypotheses which, in practice, are true enough to avoid creating any error harmful to the reliability of the system, namely that the observed brightness of a point is constant during the period of observation and that points situated close by move in the same manner and in the same direction (smoothing of velocities).

Figure 3A:
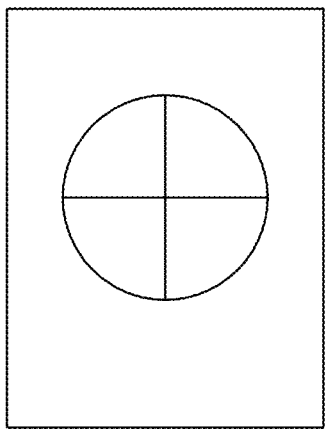
FIGS. 3a-c shows an example of generation of velocity vectors.
Figure 3B:
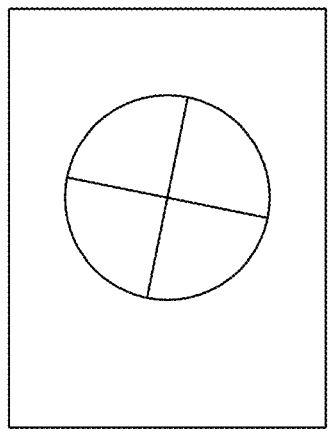
Figure 3C:
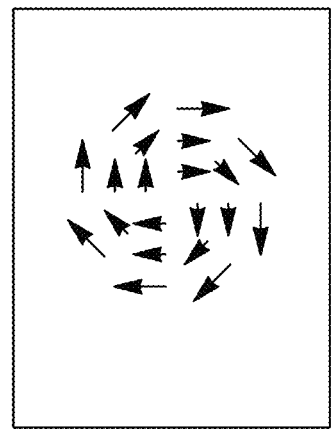

FIGS. 3*a-c* illustrate this step, with the image of a rotating circle having a first position in (a) then a second position in (b). The resultant set of velocity vectors is shown in (c).

Conventionally, in step 31, the acceleration of the point at a given instant is calculated on the basis of the evolution over time of the instantaneous velocities.

Thus, at the end of step 31, for each analysed point, its velocity (magnitude and orientation), and its acceleration at any instant are known.

If, for this point (or these points), the velocity exceeds, in magnitude, a predefined threshold velocity and if the acceleration exceeds a predefined threshold acceleration, a fall is detected, step 33.

The fall detection triggers an alarm, step 35.

This alarm is an alarm message to a video monitoring centre and/or the sending of a photograph over a telephone.

After a waiting time of typically 5 seconds, the system resets, step 37, and the detection continues again from step 23.

Figure 4:
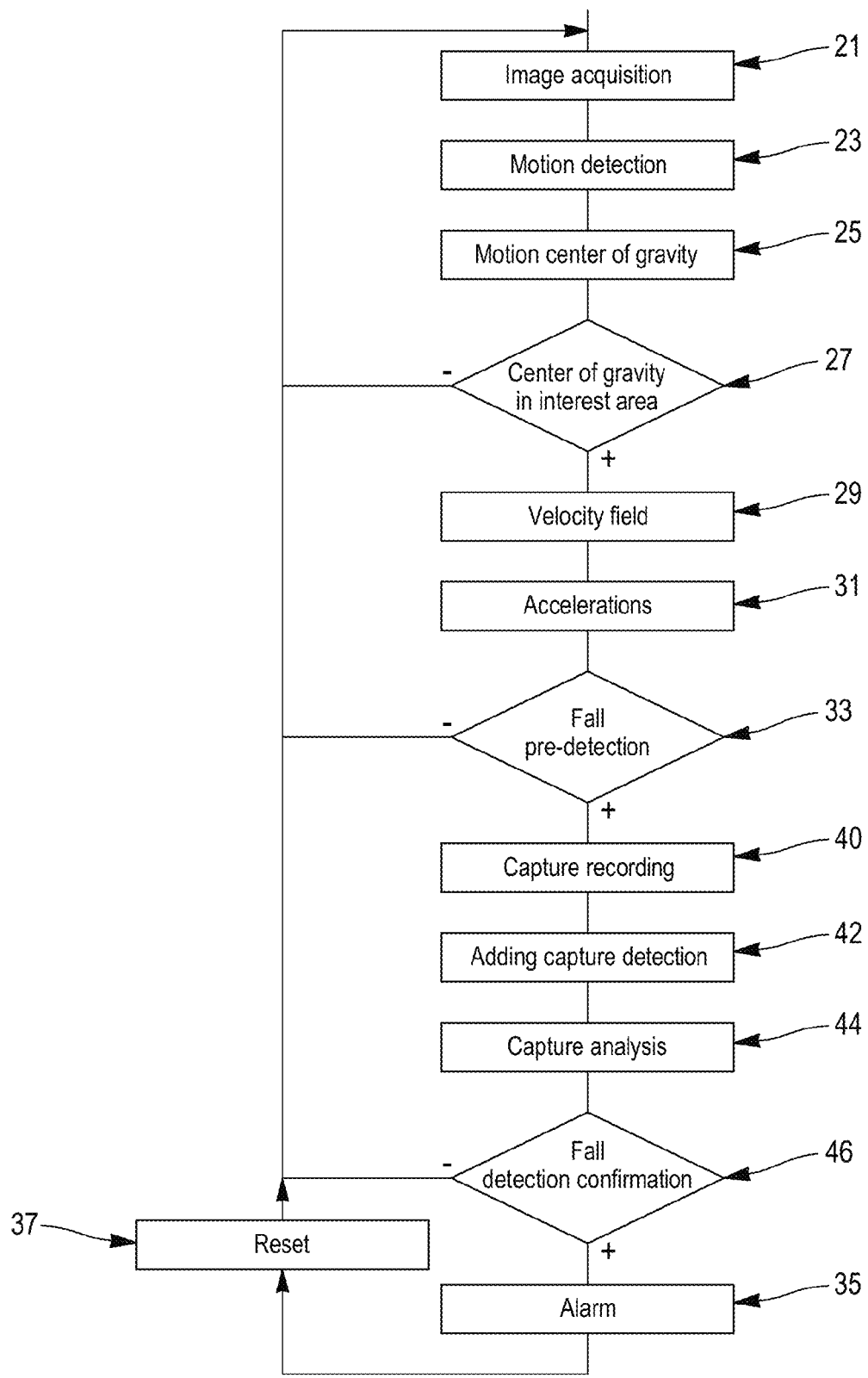
FIG. 4 shows a fall detection method in a second embodiment.

FIG. 4 illustrates an embodiment that is complementary to, but independent of, the preceding embodiment, in which the elements analogous to the preceding embodiment are referred to by identical references, and are therefore not described again. In this operating mode of the system 1 in a second embodiment, the computer 5 is equipped with a local database and the means for analysing images 7 are appropriate for implementing shape recognition software. As illustrated in FIG. 4, if a fall is pre-detected at the end of step 33, the image acquisition device 3 transmits a capture of the last image acquired to the recording server 17 which records this capture, step 40.

In a particular exemplary embodiment, an outline delimiting the region of the image associated with the supposed location of the person is added onto the image capture recorded in the server 17.

In another particular exemplary embodiment, a copy of the capture of the last acquired image is created in the recording server 17, and an outline delimiting the region of the image associated with the supposed location of the person is added to this copy.

At the end of step 40, a dedicated process of the computer 5 detects the addition of the image capture in the recording server 17, step 42. This phase of monitoring of the server 17 by the dedicated process is automatic and is performed using a known sleeping process mechanism. More precisely, the dedicated process is put into sleep mode between two consecutive additions of image captures. The process is activated only when a new image capture is added in the server 17. This makes it possible to reduce the consumption of IT resources necessary for this monitoring and thus to improve the overall performance of the method.

At the end of step 42, the image capture recorded on the server 17 is sent by the server 17 to the means for analysing images 7.

In the following step 44, the image capture is saved in the local database of the computer 5, then the means for analysing images 7 implement conventional shape recognition software, such software being parameterized so as to detect a precise shape on the image capture. In the particular exemplary embodiment in which the image capture is provided with an outline delimiting the region of the image associated with the supposed location of the person, the shape recognition software is parameterized so as to detect whether or not the shape of the outline corresponds to a fallen person.

Alternatively, in the particular exemplary embodiment in which a copy of the image capture is created in the recording server 17, the copy of the image capture is sent by the server 17 to the means for analysing images 7 at the end of step 42, then is saved in the local database of the computer and is analysed by the means for analysing images 7 during step 44.

Thus, at the end of step 44, if a shape corresponding to a fallen person is detected, the fall detection is confirmed, step 46.

The confirmation of the fall detection triggers the alarm step 35, in other words the sending of an alarm message to a video monitoring centre.

Alternatively, or in addition to the above, the triggering of the alarm step 35 corresponds to the sending of the image capture or of the copy of this capture on a telephone, and/or on an e-mail messenger, and/or on a computer comprising FTP (File Transfer Protocol) software, and/or on a web service, particularly an internet web service, and/or on a content management system.

Once the sending has been carried out, the image capture or the copy of this capture is saved in the local database of the computer 5 to indicate the end of the processing of the photograph.

After a waiting time of typically 5 seconds, the reset step 37 is implemented, and the detection continues from step 23.

This embodiment illustrated in FIG. 4 makes it possible to advantageously reduce the number of false positives, and to improve the reliability of the detection system all the more.

As a variant, in each of the two preceding embodiments, the fall is moreover detected only if a number of points above a predetermined value fulfil the conditions of velocity and acceleration. Thus, for example, the alarm will be triggered only if 5 points or above fulfil the detection condition.

This condition can be supplemented with by a second condition based on the number of images having fall criteria. For example, the alarm is triggered only if at least 5 points fulfil the detection condition out of at least 50 consecutive images.

In a second variant, apart from the analysis of the magnitude of the velocity, the orientation of the latter is also taken into account. Thus the fall detection verifies that the orientation of the velocity is inside a predefined directional sector. For example, it is verified that the velocities are orientated downwards. This advantageously makes it possible to avoid spurious detections linked, for example, to the raising of an arm, or to a quick horizontal displacement.

In a third variant, before triggering an alarm, it is verified whether the fall is followed, or not, by a movement. In the first case, this can be a sign that the person is capable of autonomy whereas the absence of movement can be a sign of loss of consciousness.

In a fourth variant, as the person monitored is wearing a fall detection bracelet, the detection by image analysis is correlated with the signal possibly transmitted by the bracelet to trigger an alarm.

In a fifth variant, the fall detection is done in real time, so as not to waste time in triggering a possible alarm. Because of this, the processing is done as the images from the video stream are acquired. As a consequence, the movement analyses are based on the last image acquired and the preceding images.

It should be noted that this alarm can take several forms. It can take the form of a display on a screen in a monitoring room and/or the sending of a message to a determined person, this message being advantageously associated with an image of the fall enabling the relevance of the alarm to be verified.

The invention claimed is:

1. Method of detecting a fall of a person by analysis of a stream of video images originating from an image capture device, comprising:

acquisition of successive images of a determined scene;

selection of at least one point of the scene in said images;

determination of the movement of each point selected by analysis of the displacement of said point in the successive images in the form of a temporal succession of vectors oriented proportionally to the instantaneous velocity of the movement of said point;

computation of the instantaneous acceleration of each point associated with each vector representing the instantaneous velocity;

detection of a fall when the determined instantaneous velocity is above a predefined threshold velocity, the instantaneous acceleration is above a predefined threshold acceleration, and the orientation of the instantaneous velocity vector is included in a predefined directional sector.

2. Method according to claim 1, wherein a capture of the last acquired image of the scene is recorded, and in that a fall is detected only if the recorded image capture or a copy of said image capture is identified as a fall scene by shape recognition software.

3. Method according to claim 1, wherein several regions of interest are defined inside the scene so that the fall detection is performed only for movements inside these regions of interest.

4. Method according to claim 1, wherein a fall is detected only if the fall detection is performed for a number of points above a predetermined value.

5. Method according to claim 1, wherein an alarm is triggered when, moreover, no movement is detected during a determined period.

6. Method according to claim 1, wherein as the person is wearing a fall detection bracelet, an alarm is triggered when a fall detected by analysis of the video stream is confirmed by the bracelet.

7. Method according to claim 5, wherein, apart from the alarm, a message accompanied by a photo of the scene is sent.

8. Method according to claim 1, wherein, with the fall detection taking place in real time, the velocity vector and the acceleration of each point are computed for each new image taking as parameter the variation of the position of the point in the new image and the preceding images.

9. A computer program recorded on a non-transitory storage medium comprising instructions for implementing the method according to claim 1 when the program is executed on a computer.

10. System for detecting the fall of a person by analysis of a stream of video images, comprising:

a device for acquiring successive images of a determined scene;

a means for selecting at least one point of the scene in said images;

a computer of the movement of each point selected by analysis of the displacement of said point in the successive images in the form of a temporal succession of vectors oriented proportionally to the instantaneous velocity of the movement of said point;

a computer of the instantaneous acceleration of each point associated with each vector representing the instantaneous velocity;

a means for detecting a fall when the determined instantaneous velocity is above a predefined threshold velocity and the instantaneous acceleration is above a predefined threshold acceleration, and the orientation of the instantaneous velocity vector is included in a predefined directional sector.

* * * * *